3,412,047
POLYURETHANE FOAMS
Leland C. Shriver, South Charleston, W. Va., assignor to Union Carbide Corporation, a corporation of New York
No Drawing. Continuation-in-part of application Ser. No. 120,483, June 29, 1961. This application Dec. 20, 1961, Ser. No. 160,913
15 Claims. (Cl. 260—2.5)

This application is a continuation-in-part of Ser. No. 120,483, filed June 29, 1961 now abandoned, which was a continuation-in-part of Ser. No. 775,107, filed Nov. 20, 1958 now abandoned.

This invention relates to foamed polymers derived from isocyanate-modified alkylene oxide addition products of certain polyphenylols, and to their method of preparation.

It has been proposed heretofore to prepare foamed polymers by forming a polyester of a triol and a dicarboxylic acid, e.g., glycerol or trimethylol propane with adipic acid, lengthening the chain by reacting the terminal active hydrogens of the polyester with a diisocyanate and simultaneously or stepwise foaming by means of a blowing agent such as carbon dioxide or a liquefied fluorocarbon which vaporizes at or below the temperature of the foaming mass. Foams of this type have given promise of finding wide utility in the field of insulation and structural reinforcement. They also have given promise of being more versatile in that they can be foamed in place to effect an obvious savings in labor and handling.

The discovery has now been made that foamed polymers of widely varying and preselected properties can readily be prepared from isocyanate-modified alkylene oxide addition products of polyphenylol compounds. The foamed polymers of the invention can be rigid or flexible, open-celled or closed-celled and the flexible foams can be resilient or flaccid. The alkylene oxide-polyphenylol addition products hereinafter described are especially suited for obtaining rigid foams which are characterized by high softening strengths and stiffness temperatures. Rigid foams prepared from such addition products show excellent compression strengths.

The foamed polymers of the invention are generally characterized by the presence of a highly developed network of crosslinked isocyanate-modified alkylene oxide-polyphenylol addition products in which the addition products are connected to organic polyisocyanate residues by means of urethane groups. The foamed products have the advantage of being capable of preparation without the application of external heat and of having high and low density by suitable modification, good resistance to solvents, and little or no tendency to support combustion. Another advantage that is most desirable from a commercial point of view is that the difficulties heretofore experienced in removing water of condensation from the polyesters and of keeping water out of the reaction until the proper time is very much reduced in that the alkylene oxide addition products utilized herein are formed without formation of water of condensation.

As used herein throughout the specification and claims, the term "isocyanate" refers to organic polyisocyanates. The term "residue" in reference to organic polyisocyanates refers to the organic portion of an isocyanate compound exclusive of the reactive isocyanato groups. The term "isocyanate-modified . . . addition products" refers to an alkylene oxide-polyphenylol reaction product in which the hydroxyl groups thereof are connected to organic polyisocyanate residues by means of the urethane linkage

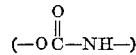

The term "polyalkyleneoxy" as employed herein refer to at least one or more alkylene groups separated by a divalent oxy group.

In accordance with this invention urethane foams are prepared by forming a foamant polymer having reactive hydroxyl groups which comprises an alkylene oxide addition product of a polyphenylol compound, extending the polymer with isocyanate, building up the network polymer and developing the foam reaction thereof by means of a blowing agent. The network formation and building up of the foam can take place substantially simultaneously as in the so-called "one-shot method" or in more or less distinct steps as in the semiprepolymer technique. For most economical operation and directness of procedure, as well as continuous operation, it is preferable to prepare the foamant, i.e., the alkylene oxide-polyphenylol addition product, in a first stage and then effect substantially simultaneous network and foam development in a second stage by admixing the foamant, polyisocyanate and blowing agent in the presence of a catalyst, or by partially extending the foamant with excess isocyanate and then adding additional foamant and blowing agent in a subsequent stage. The various stages can be extended to the point of becoming distinct or accelerated to the extent of making the successive stages almost simultaneous.

The foamant polymer or alkylene oxide-polyphenylol reaction product in the first stage is prepared by reaction of an alkylene oxide and a polyphenylol compound in the presence of a catalyst, preferably an alkaline catalyst. The resulting reaction products are identified as hydroxypolyalkyleneoxyarylalkanes which are characterized by the presence, in their molecular structure, of hydroxyl-terminated chains of alkylene links, substituted or unsubstituted, which are connected to one another by means of recurring divalent oxy groups. The preferred foamant polymers are mixtures of isomers which are generally represented by the formula:

I.

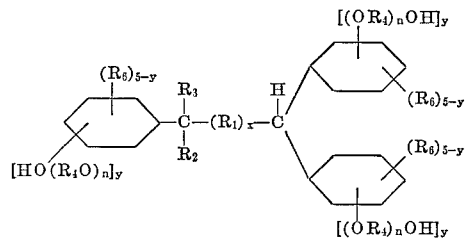

wherein $R_1$ is a divalent saturated aliphatic hydrocarbon radical containing one to ten carbon atoms, e.g., alkylene, alkylidene; wherein $x$ is an integer equal to zero or one; wherein $R_2$ is a hydrogen atom or a hydroxypolyalkyleneoxyaryl group; $R_3$ is a hydrogen atom or a lower alkyl group, e.g., methyl, ethyl, propyl, butyl, pentyl, hexyl, including their branched chain isomers; $R_4$ is a member of the class of ethylene radicals and propylene radicals or mixtures thereof; $R_6$ is a hydrogen atom or a monovalent radical selected from the group consisting of hydroxypolyalkyleneoxyarylalkyl, alkoxy, alkyl and cycloalkyl radicals, $n$ is a number having a value of at least one, and $y$ is an integer of 1 to 3.

In the above formula, illustrative radicals for $R_1$ include the branched chain and straight chain alkylene radicals such as, for example, methylene, ethylene, propylene, butylene, 2-methylbutylene, hexylene, octylene, 2,4-dimethyloctylene, 3-propylheptylene, and the like, and alkylidene radicals such as ethylidene, propylidene, isopropylidene, butylidene, isopentylidene, hexylidene, isohexylidene, octylidene, and the like. One or more of the hydrogen atoms in the radical represented by $R_1$ can be replaced with a nitro or tertiary amine group, or with a halogen group such as chlorine or bromine, or with a hydroxypolyalkyleneoxy group having the structure HO(R₄O)ₙ— wherein R₄ and n have the meanings above described. Exemplary R₆ monovalent radicals include alkoxy radicals such as methoxy, ethoxy and butoxy; alkyl radicals containing one to eighteen carbon atoms, e.g., methyl, ethyl, propyl, tertiary amyl, 2-ethylhexyl, 2,4-dimethyloctyl, decyl, dodecyl, and the like; and cycloalkyl groups such as cyclopentyl, cyclohexyl, cycloheptyl, and the like. The groups defined by R₆, i.e., a hydrogen atom or monovalent radical, can be alike or different. The R₆ hydroxypolyalkyleneoxyarylalkyl group generally contains one to three hydroxypolyalkyleneoxyaryl moieties. The R₂ hydroxypolyalkyleneoxyaryl group refers to the structure:

II.

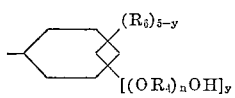

in which R₄, R₆ and y have the meanings above described.

The polyphenylol compounds which are used as starting materials for production of the foamant polyethers in their basic structure are triphenylol and tetraphenylol compounds which have one or two hydroxyaryl groups attached to each end of a divalent saturated aliphatic hydrocarbon radical. As characterized by R₁ in Formula I above, the hydroxyaryl groups are attached to carbon atoms which are adjacent or which can be separated by up to ten carbon atoms. The hydroxyaryl groups can be substituted with hydroxy groups and/or alkoxy groups and/or monovalent hydrocarbon radicals such as the alkyl and cycloalkyl groups above described, and/or one or more hydroxypolyalkyleneoxyarylalkyl groups. The alkoxy groups are preferably the lower alkoxy groups such as methoxy, ethoxy and butoxy groups. For practical reasons, the total number of carbon atoms in each of R₁ and R₆ is limited to ten and eighteen, respectively, since the higher homologues and isomers appear commercially unattractive. The substituents R₁, and R₃ and R₆, with the exception of the R₆ hydroxypolyalkyleneoxyarylalkyl group, are substantially nonreactive, i.e., they do not interfere with reaction between the alkylene oxide and phenolic hydroxyls under the reaction conditions employed.

The polyphenylol starting materials are characterized as having an average of between three and about twelve benzene nuclei per molecule and an average molecular weight between 320 and about 1800.

The polyphenylols which are used in preparing the polyethers constitute a known class of materials. The triphenylol type compounds can be prepared by reaction of a monohydroxy or polyhydroxy phenol with an olefinic aldehyde such as acrolein, ethyl acrolein, crotonaldehyde, and the like. The phenols must have at least one reactive position ortho or para to a phenolic hydroxyl group and can be substituted with one or more monovalent hydrocarbon radicals, such as alkyl, cycloalkyl, alkoxy, or additional phenolic hydroxyl groups in replacement of hydrogen atoms of the benzene nucleus. Examples of the alkyl and cycloalkyl substituted phenols include the cresols, xylenols, 2,3,5,6-tetramethyl phenol, ethyl and diethyl phenols, butyl and dibutyl phenols, amyl phenols, octyl phenols, para-cyclohexyl phenol, 2,6-dicyclohexyl phenol, cyclopentyl phenol, cycloheptyl phenol, and the like. Examples of mono- and polyalkoxy substituted phenols are the isomeric methoxy, ethoxy and butoxy phenols, and pyrogallol 1,3-dimethyl ether. Exemplary of phenols containing more than one phenolic hydroxyl group are resorcinol, pyrogallol, phloroglucinol, catechol and hydroquinone. Phenols having different radicals on the benzene nucleus include resorcinol, methyl phloroglucinol, hydroquinone, 2,5,6-trimethyl resorcinol, 4-ethyl-5,6-dimethyl resorcinol, eugenol, isoeugenol, and the like. The tetraphenylol type compounds are generally prepared, for example, by condensing an appropriate dialdehyde such as glyoxal or glutaraldehyde with a suitable phenol, as above described, in the presence of an acid catalyst.

In the preparation of the polyphenylol compounds by reaction of aldehydes with phenolic compounds, a relatively wide variety of condensation products can result. For example, in the reaction of acrolein with phenol, i.e., hydroxybenzene, the simplest condensation product resulting is tris(hydroxyphenyl)propane whereas with glyoxal the simplest product is tetrakis(hydroxyphenyl)ethane. In addition to these simple monomeric compounds, however, higher molecular weight condensation products also are formed, which is usually the case with aldehyde-phenol condensation reactions. The amount of higher molecular weight condensation products which are formed is dependent upon a variety of factors including, among others, the reactant ratios, reaction temperature, catalyst, length of reaction, ionic impurities contained in the reactants, or metallic impurities stemming from the material of construction of the reactor. Such metallic impurities, alone or together with a combination of the above factors, can and frequently catalyze rearrangement reactions of existing condensation products which may, in turn, result in a complex product mixture. It is to be understood, therefore, that the polyphenylol compounds employed for preparation of the foamant polymer can be a simple monomeric compound of definite composition or a mixture of isomers and/or higher molecular weight condensation products as obtained in the preparation of such compounds. Illustrative of a polyphenylol mixture useful in the synthesis of the invention compounds is that obtained by the condensation of phenol with acrolein and which contains the following phenylol components, among others:

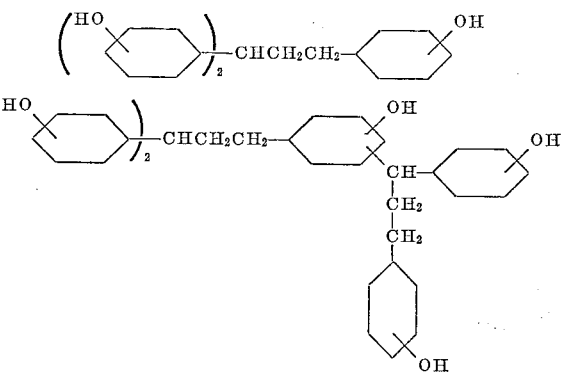

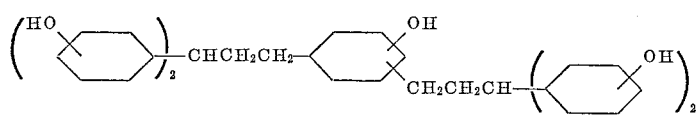

The polyphenylol mixture illustrated generally has an average phenylol content of about four to six and an average molecular weight in the range between about 450 and 650.

Polyphenylol compounds and their preparation are disclosed in United States Patents Nos. 2,801,989 and 2,779,800, hereby incorporated by reference to the extent pertinent.

Preferred triphenylol type compounds which can be employed for preparation of the foamant polyethers are the alpha,alpha,omega - tris(hydroxyphenyl)alkanes such as 1,1,2 - tris(hydroxyphenyl)ethanes; 1,1,3-tris(hydroxyphenyl)propanes; 1,1,3 - tris(hydroxy-3-methylphenyl)-propanes; 1,1,3 - tris(dihydroxy - 3 - methylphenyl)propanes; 1,1,3 - tris(hydroxy - 2,4 - dimethylphenyl)propanes; 1,1,3 - tris(hydroxy - 2,5 - dimethylphenyl)propanes; 1,1,3 - tris(hydroxy - 2,6, - dimethylphenyl)propane; 1,1,3 - tris(hydroxy - 3,5 - dimethylphenyl)propanes; 1,1,4 - tris(hydroxyphenyl)butanes; 1,1,4 - tris(hydroxyphenyl) - 2 - ethylbutanes; 1,1,4 - tris(dihydroxyphenyl)butanes; 1,1,5 - tris(hydroxyphenyl) - 3 - methylpentanes; 1,1,8 - tris(hydroxyphenyl)octanes; 1,1,10 - tris(hydroxyphenyl)decanes, and such corresponding compounds which contain substituent groups in the hydrocarbon chain, such as 1,1,3 - tris(hydroxyphenyl)-2-chloropropanes; 1,1,3 - tris(hydroxy - 3 - propylphenyl) - 2 - nitropropanes; 1,1,4 - tris(hydroxy - 3 - decylphenyl) - 2,3 - dibromobutanes, and each of the foregoing triphenylol compounds containing one or more hydroxyarylalkyl substituents on one or more of the three phenylol groups, and the like.

Preferred tetraphenylol type compounds used in the preparation of the polyethers include the alpha,alpha, omega,omega - tetrakis(hydroxyphenyl)alkanes such as 1,1,2,2 - tetrakis(hydroxyphenyl)ethanes; 1,1,3,3 - tetrakis(hydroxy - 3 - methylphenyl)propanes; 1,1,3,3-tetrakis(dihydroxy - 3 - methylphenyl)propanes; 1,1,3,3-tetrakis(hydroxy - 3,5 - dimethylphenyl)propanes; 1,1,4,4 - tetrakis(hydroxyphenyl)butanes; 1,1,4,4 - tetrakis(hydroxyphenyl) - 2 - ethylbutanes; 1,1,5,5 - tetrakis(hydroxyphenyl)pentanes; 1,1,5,5 - tetrakis(hydroxyphenyl)-3 - methylpentanes; 1,1,5,5 - tetrakis(dihydroxyphenyl)-pentanes; 1,1,8,8 - tetrakis(hydroxy - 3 - butylphenyl)-octanes; 1,1,8,8 - tetrakis(dihydroxy - 3 - butylphenyl)-octanes; 1,1,8,8 - tetrakis(hydroxy - 2,5 - dimethylphenyl)octanes; 1,1,10,10 - tetrakis(hydroxyphenyl)-decanes, and the corresponding compounds which contain substituent groups in the hydrocarbon chain, such as 1,1,6,6 - tetrakis(hydroxyphenyl) - 2 - hydroxyhexanes; 1,1,6,6 - tetrakis(hydroxyphenyl) - 2 - hydroxy -5 - methylhexanes; 1,1,7,7 - tetrakis(hydroxyphenyl) - 3 - hydroxyheptanes; 1,1,3,3 - tetrakis(hydroxyphenyl) - 2 - nitropropanes; 1,1,3,3 - tetrakis(hydroxyphenyl)-2-chloropropanes; 1,1,4,4 - tetrakis(hydroxyphenyl) - 2,3 - dibromobutanes, and each of the foregoing tetraphenylol compounds containing one or more hydroxyarylalkyl substituents on one or more of the four phenylol groups, and the like.

To obtain the hydroxypolyalkyleneoxyarylalkane foamant polymers, the polyphenylol compounds above described are reacted with a 1,2-alkylene oxide selected from the group consisting of ethylene oxide and propylene oxide, or mixtures thereof. The reaction is conducted in the presence of a small amount of catalyst by adding the alkylene oxide to the polyphenylol material which is preferably stirred and in a molten state. The reactants and catalyst can be introduced into the reaction vessel in any desired sequence or simultaneously. The reaction is carried out under atmospheric or superatmospheric pressure at temperatures of about 110° C. to 170° C. The reaction can be conducted in the presence of an inert solvent, e.g., tetrahydrofuran, dimethyl formamide, dioxane, and the like, and to the extent required, any conventional heat transfer means can be used to remove the exothermic heat of reaction.

The amount of alkylene oxide to be reacted with the polyphenylols is determined by the average molecular weight of the product desired. For the new reaction products described herein which have utility as intermediates in the preparation of foams, the molecular weights, based on the hydroxyl value, can range from about 450 to 10,000 or more. To obtain such products having the desired molecular weights the polyphenylol starting materials are treated with the 1,2-alkylene oxide until each adduct represented in Formula I above by —$(OR_4)_nOH$ contains at least one mole of alkylene oxide. Within these limits, of course, the addition of alkylene oxide to each phenolic hydroxyl group can be balanced or unbalanced, i.e., each can contain approximately the same or different average number of alkylene oxide groups per chain. For high molecular weight products the total moles of alkylene oxide reacted with each phenolic hydroxyl group can range from 1 to about 100 moles or more.

The time required for completion of the alkylene oxide addition will vary. In general, a longer time of alkylene oxide addition is required for products of high molecular weight whereas with a low molecular weight product the reaction is faster and the addition time is short. Additionally, at lower temperatures than those above described, the alkylene oxide addition for high molecular weight products, e.g., 10,000 or more, may require an impractical amount of time such as several weeks. For the products hereinafter prepared, the time required for alkylene oxide addition ranged from about six hours to several days.

In carrying out the alkylene oxide reaction with the polyphenylol compounds, any of the known catalysts for this type of addition reaction can be employed. The preferred catalysts are alkaline catalysts, e.g., alkali metal catalysts such as sodium hydroxide and potassium hydroxide, which preferentially activate phenolic hydroxyl groups in the presence of aliphatic hydroxyls. The amount of catalyst employed is preferably in the range of 0.001 to 2.0 percent by weight, based on the total amount of reactants, including the alkylene oxide or mixtures thereof appearing in the reaction product. An amount of active catalyst within this range is not so large as to cause excessive decomposition of the alkylene oxide addition product of the main reaction, and good results have been obtained with about 0.03 to 0.5 percent by weight, based on the total reactants, of sodium hydroxide or potassium hydroxide. By active catalyst is meant the amount of catalyst present which has an alkalinity on the order of the alkali metal hydroxides. In general, the stronger the alkalinity of the catalyst, the less of it is required. All of the catalyst need not be added at the start of the reaction. If desired, a suitable amount can be initially added and the remainder of the catalyst added from time to time throughout the course of the reaction to maintain a substantially constant catalyst concentration.

As above mentioned, the molecular weights of the foamant polymers depend upon the amount of alkylene oxide utilized in the reaction. The average molecular weight and reactivity of the hydroxypolyalkyleneoxyarylalkanes prepared herein can be determined readily by analysis for hydroxyl content. The hydroxyl number is a measure of and is proportional to the hydroxyl concentration per unit weight. The hydroxyl number is defined in terms of milligrams of KOH equivalent per gram of alkylene oxide-polyphenylol reaction product and is determined by reacting acetic anhydride (in pyridine solution) at refluxing temperature with the hydroxyl groups of the alkylene oxide-polyphenylol reaction product. The unreacted anhydride and acetic acid formed are titrated with aqueous sodium hydroxide using phenolphthalein as an indicator. The molecular weight can be readily calculated from the hydroxyl number of the formula:

III.

$$\text{Molecular Weight} = \frac{\text{Functionality} \times 1000 \times 56.1}{\text{Hydroxyl Number}}$$

After preparation of the alkylene oxide-polyphenylol foamant polymers, the foaming operation can be carried out continuously or batchwise. The one-shot method, involving substantially simultaneous icocyanate extension of the foamant, crosslinking and foam formation, is the most direct and economical. The semiprepolymer technique, involving partial extension of the foamant with excess isocyanate followed by foaming and network development at a later stage, is desirable when the final processing is to be kept to a minimum. It is occasionally also desirable in the case of flexible foams to form a prepolymer by prereacting molar equivalents of the foamant and isocyanate in the absence of water and thereafter producing a foam by the addition of excess isocyanate, a catalyst, water and a surfactant.

A variety of isocyanates can be employed for reaction with the polyethers above described to provide urethane foams which can be prepared according to the invention. Preferred isocyanates are polyisocyanates and polyisothiocyanates of the general formula:

wherein G is oxygen or sulfur, $x$ is an integer of two or more, and R is an alkylene, substituted alkylene, arylene or substituted arylene radical, a hydrocarbon, or substituted hydrocarbon containing one or more aryl —NCG bonds and one or more alkyl —NCG bonds. R can also include radicals such as —RZR— where Z can be a divalent moiety such as —O—, —O—R—O—, —CO—, —CO$_2$—, —S—, —S—R—S—, —SO$_2$—, and the like. Examples of such compounds include hexamethylene diisocyanate, 1,8-diisocyanato-p-methane, xylylene diisocyanates, (OCNCH$_2$CH$_2$CH$_2$OCH$_2$)$_2$, 1-methyl-2,4-diisocyanatocyclohexene, phenylene diisocyanates, tolylene diisocyanates, chlorophenylene diisocyanate, diphenylmethane-4,4′-diisocyanate, naphthalene-1,5-diisocyanate, triphenylmethane-4,4′,4″-triisocyanate, xylene-α,α′-diisothiocyanate, and isopropylbenzene-α,4-diisocyanate.

Further included are dimers and trimers of isocyanates and diisocyanates and polymeric diisocyanates of the general formulas:

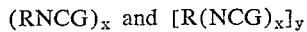

in which $x$ and $y$ are two or more, as well as compounds of the general formula:

in which $x$ is two or more and M is a monofunctional or polyfunctional atom or group. Examples of this type include ethylphosphonic diisocyanate, C$_2$H$_5$P(O)(NCO)$_2$; phenylphosphonic diisocyanate, C$_6$H$_5$P(NCO)$_2$; compounds containing a ≡Si—NCG group; isocyanates derived from sulfonamides, R(SO$_2$NCO)$_x$, and the like.

A particularly useful mixture of polyisocyanates are the products obtainable by phosgenation of the reaction products of aniline and formaldehyde as expressed by the following general formula:

IV.
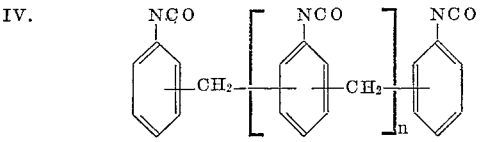

wherein $n$—0 to 3.

The amount of polyisocyanate reacted with the foamant polymer in preparation of a flexible, rigid or semirigid foam will depend upon the density of the urethane foam and the amount of crosslinking desired. In general, the total —NCO equivalent to total active hydrogen equivalent, including water, should be such as to provide a ratio of 0.8 to 1.2 equivalents of —NCO per equivalent of active hydrogen and preferably a ratio of about 0.9 to 1.1 equivalents.

The reaction between isocyanate and the foamant polymer can be modified considerably. Thus, for example, it is within the scope of the invention to add varying amounts of polyfunctional compounds to the foamant polymer before reacting it with isocyanate. These compounds have lower molecular weights than the foamant polymer, and in the case of the polyol compounds have higher hydroxyl numbers than the foamant polymer. The functionality of these compounds is provided by active hydrogens which are reactive with polyisocyanate. Such compounds include, among others, alkylene glycols such as ethylene glycol, diethylene glycol, triethylene glycol, tetraethylene glycol and the corresponding propylene homologs such as propylene glycol, dipropylene glycol, and the like; saturated aliphatic polyols such as glycerol, 1,2,4-butanetriol, 1,2,6-hexanetriol, trimethylolpropane, sorbitol, pentaerythritol, and the like; acyclic amines such as triethanolamine, triisopropanolamine, and the like; acyclic polyamines such as ethylenediamine, diethylenetriamine, triethylenetetramine, and the like. Further included are the ethylene, propylene and butylene oxide addition products of the above-noted aliphatic polyols and amines which have hydroxyl numbers in the range of about 300 to 750. When admixed with the foamant polymer, such compounds serve to increase the hydroxyl number thereof and also reduce its viscosity. After reaction with isocyanate, this modification has the advantage of further diversifying the combinations of characteristics obtainable in the ultimate foam product by increasing the number of crosslinking sites which, in turn, results in a rapid buildup of viscosity simultaneously with foam development. Addition of such crosslinking agents often results in improved dimensional properties such as improved resistance to humid aging. The amount of polyfunctional compound admixed with the foamant polymer will depend on the viscosity and hydroxyl number required to obtain a satisfactory foam. For example, in the preparation of rigid foams, the viscosity of the foamant must be such as to permit satisfactory agitation at temperatures within a range of about 24° C. to 50° C. For rigid foams, the hydroxyl number of the physical mixture of polyfunctional compound and foamant, prior to the foaming operation, should be within a range of 300 to 500. As a specific example, a mixture having a hydroxyl number of 393 containing 63 percent by weight of 1,1,3-tris (hydroxylpolypropyleneoxyphenyl) propane (hydroxyl number 252) and 37 percent by weight of a glycerol-propylene oxide adduct (hydroxyl number 632) was foamed very satisfactorily to obtain a rigid foam having excellent physical properties.

The reaction of the foamant polymer with the polyisocyanate, which is exothermic, can be accomplished at temperatures varying from room temperature, i.e., about 24° C., up to temperatures of about 200° C. The upper limit of reaction temperature is based on the thermal stability of the foamant-isocyanate reaction product whereas the lower limit is determined by the lowest economical rate of reaction. Generally at temperatures below about 75° C. the reaction is too slow to be feasible unless a catalyst is employed. At temperatures higher than about 300° C. there is danger of destructive decomposition of the reactants and reaction products. If the isocyanate-modified foamant is a prepolymer and is to be stored before use, it is preferable to carry out the reaction with isocyanate in the absence of a catalyst and at temperatures within the range of about 70° C. to 120° C. The time of reaction will vary of course depending upon temperature as well as upon the absence or presence of a catalyst or retarder and the identity thereof.

It is often desirable in the preparation of a prepolymer to add a retarder during or after the isocyanate reaction, especially if the isocyanate-modified foamant is intended to be stored. This not only slows down, as the name implies, the rate of reaction between hydroxyl and isocyanato groups, but also inhibits reaction between the urethane groups formed and the isocyanato groups. Among the suitable retarders are acids such as hydrochloric acid, sulfuric acid, phosphoric acid, boric acid, various organic acids, organic acid halides such as acetyl chloride, benzoyl chloride and acetyl bromide, sulfonyl halides such as para-toluene sulfonyl chloride, inorganic acid halides such as phosphorous tribromide, phosphorous trichloride, phosphorous oxy chloride, sulfonyl chloride and thionyl chloride, as well as sulfur dioxide and acidic sulfones.

When it is desired to form a foam, a mixture of the isocyanate-modified foamant and excess uneracted isocyanate can be mixed with water, preferably in the presence of a catalyst. This involves several reactions that proceed simultaneously. One illustrated schematically in the equation:

V.

2 ... GNCO+H$_2$O
→ ... GNHCONHG ... +CO$_2$ involves the reaction between the isocyanate groups and water to form urylene links and carbon dioxide. This reaction has the important effect of producing carbon dioxide in situ for forming the voids of the final foamed product and also of linking the terminal isocyanato groups and thereby extending the isocyanate-modified foamant. Another of the reactions involves reaction of the urylene links so formed with unreacted isocyanato groups to form biuret crosslinks as illustrated by the equation:

VI.

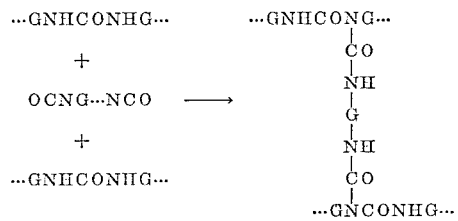

The formation of a good foam depends upon a simultaneous development of carbon dioxide and a crosslinking of the molecules to trap the carbon dioxide and thus prevent collapse of the foam.

Depending upon the desired density of the foam and the amount of crosslinking desired, the amount of water added should be such that the ratio of equivalents of water to residual isocyanate equivalents, i.e., the isocyanate which is present as excess isocyanate over the reactive groups of the foamant polymer, is preferably kept within the range of from 0.5:1.0 to 1.5:1.0 and most preferably within a range of about 0.8:1 to 1.2:1.

The foaming operation may also be effected by liquefied fluorocarbon gases which have boiling points below about 80° F. and above −60° F. The liquefied gases are saturated aliphatic hydrocarbons which vaporize at or below the temperature of the foaming mass. Such gases are at least partially fluorinated and may also be otherwise halogenated.

Preferred blowing agents are the fluorocarbons such as trichloromonofluoromethane; dichlorodifluoromethane, dichlorofluoromethane, 1,1-dichloro-1-fluoroethane; 1-chloro-1,1-difluoro-2,2-dichlorothane; and 2-chloro-1,1,1,2,3,3,4,4,4-nonafluorobutane. The amount of blowing agent used will vary with density desired in the foamed product. In general, it may be stated that for 100 grams of resin mix containing an average NCO/OH ratio of 1 to 1, about 0.005 to 0.3 moles of gas are used to provide densities ranging from 30 to 1 pounds per cubic foot. If desired, water can be used in conjunction with the fluorocarbon.

Catalysts that are suitable for the foaming and crosslinking or curing reaction include inorganic and organic bases such as sodium hydroxide, sodium methylate, sodium phenolate, tertiary amines and phosphines. Particularly suitable amine catalysts include triethylenediamine, trimethylamine, 1,2-dimethylimidazole, triethylamine, diethyl cyclohexylamine, dimethyl long-chain C$_{12}$ to C$_{18}$ amines, dimethylaminoethanol, diethylaminoethanol, N-methyl morpholine, N-ethyl morpholine, triethanolamine, and the like. Other suitable catalysts include arsenic trichloride, antimony trichloride, antimony pentachloride, antimony tributoxide, bismuth trichloride, titanium tetrachloride, bis(cyclopentadienyl) titanium difluoride, titanium chelates such as octylene glycol titanate, dioctyl lead dichloride, dioctyl lead diacetate, dioctyl lead oxide, trioctyl lead chloride, trioctyl lead hydroxide, trioctyl lead acetate, copper chelates such as copper acetylacetonate, and mercury salts.

Organic tin compounds characterized by at least one direct carbon-to-tin valence bond are also suitable as catalysts for the foaming reaction. Among the many types of tin compounds having carbon-to-tin bonds, of which specific representative compounds have been tested and shown to be active, are tin compounds having the general formulas set forth below:

(a) R$_3$SnX
(b) R$_2$SnX$_2$
(c) RSnX$_3$
(d) R$_2$SnY
(e) RSnOOR′
(f) R(SnOOR′)$_2$
(g)

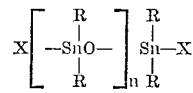

(h) R$_2$Sn(YRX)$_2$ in which R represents hydrocarbon or substituted hydrocarbon radicals such as alkyl, aralkyl, aryl, alkaryl, alkoxy, cycloalkyl, alkenyl, cycloalkenyl and analogous substituted hydrocarbon radicals, R′ represents hydrocarbon or substituted hydrocarbon radicals such as those designated by R or hydrogen or metal ions, X represents hydrogen, halogen, hydroxyl, amino, alkoxy, substituted alkoxy, acyloxy, substituted acyloxy, acyl radicals or organic residues connected to tin through a sulfide link, and Y represents chalcogens including oxygen and sulfur.

Among the compounds of group (a) that deserve special mention are trimethyltin hydroxide, tributyltin hydroxide, trimethyltin cloride, trimethyltin bromide, tributyltin chloride, trioctyltin chloride, tripenyltin chloride, tributyltin hydride, triphenyltin hydride, triallyltin chloride and tributyltin fluoride.

The compounds in group (b) that deserve particular mention and are representative of the group include dimethyltin diacetate, diethyltin diacetate, dibutyltin diacetate, dioctyltin diacetate, dilauryltin diacetate, dibutyltin dilaurate, dibutyltin maleate, dimethyltin dichloride, dibutyltin dichloride, dioctyltin dichloride, diphenyltin dichloride, diallyltin dibromide, diallyltin diiodide, bis(carboethoxymethyl)tin diiodide, dibutyltin dimethoxide, dibutyltin dibutoxide, (C$_4$H$_9$)$_2$Sn[OCH$_2$(CH$_2$OCH$_2$)$_{x-1}$CH$_2$OCH$_3$]$_2$ in which $x$ is a positive integer, dibutyl-bis[O-acetylacetonyl]tin, dibutyltin-bis(thiododecoxide), and

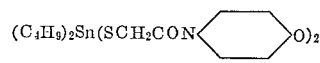

all readily prepared by hydrolysis of the corresponding dihalides. Many commercially available compounds used as stabilizers for vinyl resins are also included in this group.

Among the compounds that are representative of group (c) are butyltin trichloride, octyltin trichloride, butyltin triacetate and octyltin tris(thiobutoxide).

Typical among the compounds of group (d) are dimethyltin oxide, diethyltin oxide, dibutyltin oxide, dioctyltin oxide, dilauryltin oxide, diallyltin oxide, diphenyltin oxide, dibutyltin sulfide, [HOOC(CH$_2$)$_5$]$_2$SnO,

[CH$_3$OCH$_2$(CH$_2$OCH$_2$)$_{x-1}$CH$_2$]$_2$SnO and [CH$_3$OCH$_2$(CH$_2$OCH$_2$)$_{x-1}$CH$_2$O(CH$_2$)$_5$]$_2$SnO, in which $x$ is a positive integer.

Methylstannonic acid, ethylstannonic acid, butylstannonic acid, octylstannonic acid, HOOC(CH$_2$)$_5$-SnOOH, (CH$_3$)$_3$N⁺(CH$_2$)$_5$SnOOH, CH$_3$OCH$_2$(CH$_2$OCH$_2$)$_{x-1}$CH$_2$SnOOH and $CH_3OCH_2(CH_2OCH_2)_{x-1}CH_2O(CH_2)_5SnOOH$ are examples of group (e) catalysts and group (f) catalysts are represented by $HHOSn(CH_2)_xSnOOH$ and $HOOSnCH_2(CH_2OCH_2)_xCH_2SnOOH$, $x$ being a positive integer.

Typical compounds in group (g) include compounds as poly(dialkyltin oxides) such as dibutyltin basic laurate and dibutyltin basic hexoxide.

Other compounds that are efficient catalysts are those of group (h), of which the organo-tin compounds used as heat and light stabilizers for chlorinated polymers and available under the trade names Advastab 17 M (a dibutyl tin compound found, upon analysis, to contain two sulfur-containing ester groups), Advastab T–50–LT (a dibutyl tin compound found, upon analysis, to contain two ester groups) are typical, as well as many other organo-tin compounds available commercially.

Other tin compounds that deserve particular mention are stannous acylates such as stannous acetate, stannous octoate, stannous laurate, stannous oleate, and the like; stannous alkoxides such as stannous butoxide, stannous 2-ethylhexoxide, stannous phenoxide, and the like; and stannic alkoxides such as stannic butoxide, stannic 2-ethylhexoxide, and the like.

It is also within the scope of the invention to accelerate the polyether-isocyanate reaction with combinations of the metal catalysts described above and tertiary amine catalysts. Such catalyst combinations are often superior when compared with the use of tertiary amine catalyst or metallic catalysts alone.

If desired, the above catalysts can be used to accelerate the reaction of the foamant polymer with isocyanate, particularly if the isocyanate-modified foamant is formed immediately before use to form a foam, or if the foaming operation is made continuous.

The rigidity or flexibility of the final foam product is influenced by the degree of branching in the molecular structure as well as by the molecular weight of the foamant polymer. Highly branched chain structures, such as are produced herein by use of triphenylol and tetraphenylol compounds, and shortened chain lengths from the center of the foamant molecule to the terminal hydroxyl group tend to produce rigid foams of closed-cell structure whereas lengthened chain structures favor production of open-celled flexible foams. The presence of many benzene rings in the foamant polymers described herein is a prime factor in providing rigid foams of increased softening and stiffness temperatures.

In order to stabilize the composition during the foaming operation it is advantageous to employ a small percentage, e.g., about 0.001 to 10 percent by weight, based on the total ingredients, of a stabilizing or thickening agent such as methoxylated cellulose, available on the market as "Methocel," ethoxylated cellulose, available as "Ethocel," hydroxy ethylated cellulose, available as "Cellosize," benzyl cellulose, acetyl cellulose, acetyl butyryl cellulose, hydroxy ethylated polyvinyl alcohol, polyvinyl chloride, vinyl chloride-vinyl acetate copolymers, polyvinyl acetate, polyvinyl butyral, polymeric methyl-methacrylate, polymeric butylmethacrylate, high molecular weight polyethylene oxide, Bentone, and metallic soaps of fatty acids such as aluminum stearate.

It is within the scope of the invention to add fillers such as clays, powdered aluminum or diatomaceous earths in quantities up to 20 percent by weight, based on the weight of total ingredients. Dyes may also be added prior to the foaming step and are often desirable since polyurethane foams normally exhibit a slight tendency to yellow on aging.

It is also within the scope of the invention to employ small amounts, e.g., about 0.001 to 5 percent by weight, based on the total ingredients, of an emulsifying agent such as polyethoxylated vegetable oil commercially available as "Selectrofoam 6903," "Emulphor El–720," or a siloxane-oxyalkylene copolymer having from about 10 to 80 percent by weight of siloxane polymer and from 90 to 20 percent by weight of alkylene oxide polymer, such as the copolymers described in United States No. 2,834,748. Although the use of an emulsifier is desirable to influence the type of foam structure that is formed, the foam products of the invention can be prepared without emulsifiers.

The foam products of the invention can readily be prepared to have, in addition to the characteristics already referred to, densities advantageously within the range of about 1.0 to 30 pounds per cubic foot. Within this range, densities of the order of 1.5 to 15 pounds per cubic foot are generally preferred for rigid structural foams.

The utility and advantages of the product and methods of the invention will become more apparent from the following examples included to illustrate the best mode now contemplated for carrying out the invention.

In evaluating the physical properties of the foams produced in the various examples, two tests were employed for obtaining the load bearing versus temperature characteristics of the foams. The first test, designated as the softening temperature, measures the temperature at which the foam has lost substantially all of its load bearing ability and has, in fact, become soft and elastic. In this test a ¼" x ¼" x 2½" "beam" of foam was anchored horizontally at one end by fitting it tightly into a hole at the bottom end of a vertical board. The board was then placed upright in an oven and the temperature increased, in approximately 10° C. increments, until the test piece bends over to an angle of approximately 45° C. The second test, referred to as the stiffness temperature, measures the loss in tensile load with increasing temperature at a constant deflection of one percent. The foam test piece, ¼" x ¼" x 2", was subjected to tension in an Instron tester. A constant elongation of 1.0 percent is maintained while the temperature of the test piece is increased and the loss in tensile load plotted against increasing temperature. The temperature at which 50 or 70 percent of the original load measured at 25° C. remains is taken as the stiffness temperature. To evaluate compression strength, a cylindrical sample two inches in diameter and one inch thick was subjected to a compression load in an Instron tester and a deflection load curve obtained. The compression strength is given in pounds per square inch (p.s.i.) at a deflection ranging up to 10 percent. To measure the tensile strength, a cylindrical sample on inch thick and one square inch in cross-section was adhered to a metal plate at each end and extended in a Scott tensile tester, the load at rupture being recorded in terms of pounds per square inch (p.s.i.). The density of the samples was determined by weighing a cylindrical sample two inches in diameter and one inch in thickness and calculating the density in pounds per cubic foot.

The closed cell content was measured according to the method of Remington and Pariser, Rubber World, 138, 261 (1958). The humid aging values were obtained by exposing two-inch skim-free foam cubes at 158° F. and 95 to 100 percent relative humidity for a period of four weeks. Where the faces of specimens remained flat, average dimensions were measured on a dial indicator. Where faces warped, the weight of water displaced by aged specimens was measured. In either case, the new specimen volume was computed and "percent increase in volume" was calculated by comparison with the original value.

In most of the following examples the foamant polymers were prepared at atmospheric pressure. In the preparation of small quantities of material on a laboratory scale atmospheric pressure can be employed. For large scale plant production operation, however, operation under pressure is more desirable. The preparations were carried out in an appropriate size flask equipped with a stirrer and Dry Ice-acetone condenser. Ethylene oxide was fed into the molten polyphenylol compound as a gas through a tube with the outlet below the reaction mixture level; propylene oxide was fed as a liquid and was introduced from a dropping funnel. The catalyst employed was an alkali metal hydroxide which was added in crushed form or in a water-methanol solution. In some instances the polyphenylol starting material was initially vacuum stripped to remove impurities. After reaction with alkylene oxide, the catalyst was diluted with a solvent, neutralized and vacuum stripped to remove the solvent. Neutralization was effected by means of phosphoric acid or by removing the alkali metal ions with an ion exchange resin. The pH values given in the examples were obtained by shaking 5 percent mixtures of the foamant in neutral water. The pH of the supernatant water layer was then determined by conventional methods.

EXAMPLE 1

Preparation of 1,1,3-tris(hydroxypolypropyleneoxyphenyl) propanes 320 grams of 1,1,3-tris(hydroxyphenyl) propane [1] were mixed with 1.6 grams of sodium hydroxide. The mixture was heated to a temperature between about 165° C. to 170° C. and 522 grams (9.0 moles) of propylene oxide was fed to the mixture over a period of 25.5 hours. 407 grams of the reaction product was dissolved in 800 cc. of neutral 1,4-dioxane and allowed to flow by gravity through a 35 mm. diameter x 1 foot long tube of Dowex 50-X8 cation exchange resin. The pH of the dioxane was 4.3. The neutralized dioxane solution was stripped up to a temperature of 160° C. at a pressure of 3 milliliters of mercury. The product analyzed as follows:

Hydroxyl number _____ 214.2
Propyleneoxy groups per chain (average) _____ 2.68

75 grams of the foamant polymer prepared above were mixed with 1.0 gram of water, 0.5 gram of a polyoxyethylated vegetable oil known as "Selectrofoam No. 6903" and 1.0 gram of dioctyltin oxide. 36.5 grams of a mixture of 70 percent of 2,4- and 30 percent 2,6-toluene diisocyanates containing 0.10 percent "Ethocel" (an ethoxylated cellulose having an average ethoxy content of 47.5 to 49 percent) were then added under intensive agitation. As soon as the foaming reaction began the mixture was transferred into an open mold and allowed to set for twenty-four hours at room temperature for complete curing. The test results were as follows:

Density, lbs./cu. ft. _____ 3.49
50% stiffness _____° C__ 83
Softening temperature _____° C__ 110
Maximum compression strength, p.s.i. at 9.6% deflection _____ 61.5

EXAMPLE 2

Preparation of 1,1,2,2-tetrakis(hydroxypolyethyleneoxyphenyl) ethanes 100 grams (0.25 mole of theoretical value) of 1,1,2,2-tetrakis(hydroxyphenyl) ethanes [2] and 1.0 gram of po-

[1] Reaction product of acrolein and phenol prepared in the following manner: To 2820 grams (30 moles) phenol containing 1.8 cc. concentrated HCl (37%) there were added dropwise 168 grams (3 moles) acrolein at 40° C.-45° C. The reaction was exothermic and cooling was required. It required one hour for all the acrolein to be added to the phenol. After the exothermic reaction ceased, heating was continued for one hour at 100° C. Unreacted phenol was then distilled off under reduced pressure (10-12 mm. Hg) to a temperature of 200° C. (thermometer bulb in the residue). The reddish colored residue was a liquid at 100° C. and solidified to a fusible brittle solid at room temperature (865 grams). Analysis of the product gave the following results: OH 15.1%; hydroxyl number 482.

[2] Reaction product of glyoxal and phenol prepared in the following manner: A charge of 3841 grams (41 moles) of phenol and 560 grams of a 30% aqueous solution of glyoxal (3 moles) was placed in a five-liter distillation flask. The water of solution was removed by distillation under reduced pressure to a final kettle temperature of 80° C. at 33 mm. The mixture was cooled to 40° C. and 16 cc. of concentrated hydrochloric acid catalyst was added. After reaction for 4 hours at 40° C. to 50° C. the unreacted phenol and water of reaction was distilled off to a kettle temperature of 180° C. at 2 mm. The residue weighed 1171 grams, hydroxyl number 496.

tassium hydroxide were heated and vacuum stripped up to a temperature of 168° C. at a pressure of 2 millimeters of mercury. The mixture was maintained at a temperature between 160° C. to 173° C. and 148 grams (3.4 moles) of ethylene oxide was fed to the mixture over a period of nineteen hours. The reaction mixture was neutralized to a pH of 5.1 by the addition of 1.0 gram of 85 percent phosphoric acid. The neutralized product was then vacuum stripped up to a temperature of 165° C. at a pressure of 2 millimeters of mercury. The product analyzed as follows:

Hydroxyl number _____ 213.3
Ethyleneoxy groups per chain (average) _____ 3.70

75 grams of the foamant polymer prepared above were mixed with 1.0 gram of water, 0.5 gram of surfactant and 0.25 gram of dioctyltin oxide as a 65 percent solution in benzene. 35.0 grams of a mixture of 70 percent of 2,4- and 30 percent 2,6-toluene diisocyanates containing 0.10 percent "Ethocel" were added under intensive agitation. As soon at the foaming reaction began the mixture was transferred into an open mold and allowed to set for twenty-four hours at room tempertaure. The test results were as follows:

Density, lbs./cu. ft. _____ 2.92
Maximum compression strength, p.s.i., at 5.5% deflection _____ 43.3
Tensile strength, p.s.i. _____ 96
Softening temperature, ° C. _____ 110

EXAMPLE 3

Preparation of 1,1,5,5-tetrakis-(hydroxypolyethyleneoxyphenyl) pentanes 419 grams of 1,1,5,5 - tetrakis(hydroxyphenyl) pentanes [3] were mixed with 0.45 gram of potassium hydroxide. The mixture was heated to a reaction temperature of about 160° C. and 553 grams (12.5 moles) of ethylene oxide were fed to the mixture over a period of 29.5 hours. The pH of the reaction mixture was adjusted to 4.6 by addition of 0.65 gram of 85 percent phosphoric acid. The mixture was then stripped up to a temperature of 170° C. at a pressure of 2.5 millimeters of mercury. The product analyzed as follows:

Hydroxyl number _____ 228.4
Ethyleneoxy groups per chain (average) _____ 3.07

75 grams of the foamant polymer prepared above were mixed with one gram of water, 0.5 gram of surfactant and 0.125 gram of dioctyltin oxide (61 percent solution in benzene). 36.5 grams of a mixture of 70 percent of 2,4- and 30 percent of 2,6-toluene diisocyanates containing 0.1 percent "Ethocel" were added under intensive agitation. After the foaming reaction began the mixture was transferred into an open mold and allowed to set for twenty-four hours at room temperature. The test results were as follows:

Density, lbs./cu. ft. _____ 3.90
Maximum compression strength, p.s.i., at 7.7% deflection _____ 35.7
Softening temperature, ° C. _____ 110

[3] Reaction product of glutaraldehyde and phenol prepared in the following manner: A charge of 3290 grams of phenol (35 moles) and 728 grams of 34.2% aqueous glutaraldehyde (2.5 moles) was placed in a distillation flask. The major part of the water of solution was distilled off under reduced pressure until the kettle temperature reached 80° C. at 50 mm. The mixture was cooled to 40° C. and 15 cc. of concentrated hydrochloric acid was added. After reaction for 4 hours at 50° C. the excess phenol and the water of reaction was distilled off to a final kettle temperature of 180° C. at 2 mm. The residue product weighed 1020 grams, hydroxyl number 469.5.

EXAMPLE 4

Preparation of 1,1,6,6-tetrakis(hydroxypolyethyleneoxyphenyl)-2-hydroxy hexanes 235 grams of 1,1,6,6 - tetrakis(hydroxyphenyl)-2-hydroxyhexanes [4] and 2.4 grams of potassium hydroxide were vacuum stripped up to a temperature of 170° C. at 3 millimeters of mercury pressure. 388 grams of ethylene oxide was fed to the mixture for a period of nineteen hours at a reaction temperature of about 150° C. under atmospheric pressure. The reaction mixture was neutralized with 2.5 grams of 85 percent phosphoric acid and then stripped. The final product had a pH of 4.0 and was a dark brown viscous liquid which analyzed as follows:

Hydroxyl number _____ 177.8
Ethyleneoxy groups per chain (average) _____ 3.53

75 grams of the foamant polymer prepared above were mixed with one gram of water, 0.5 gram of surfactant and 0.5 gram of dioctyltin oxide (61 percent solution in benzene). 48.5 grams of a mixture of 70 percent of 2,4- and 30 percent of 2,6-toluene diisocyanates containing 0.10 percent "Ethocel" were added under intensive agitation. As soon as the foaming reaction began the mixture was transferred into an open mold and allowed to set for twenty-four hours at room temperature. The test results were as follows:

Density, lbs./cu. ft. _____ 4.48
Maximum compression strength, p.s.i., at 8% deflection _____ 81.9
Tensile strength, p.s.i. _____ 128
Softening temperature, ° C. _____ 140
50% stiffness temperature, ° C. _____ 88

EXAMPLE 5

Preparation of glycerol-propylene oxide adduct (A) Four moles (368.4 grams) of glycerol were mixed with 0.75 gram of potassium hydroxide. The mixture was heated to a temperature between about 95° C. to 130° C. and 725.6 grams (12.5 moles) of propylene oxide was fed to the mixture over a period of 45.75 hours. The product was neutralized to obtain a glycerol-propylene oxide adduct which analyzed as follows:

Hydroxyl number _____ 650.5
Propyleneoxy groups per chain (average) _____ 0.96

Preparation of rigid foam (B) 70 grams of 1,1,3-tris(hydroxypolypropyleneoxyphenyl) propanes (hydroxyl number 262.2) prepared in the manner of Example 1 were mixed with 30 grams of the glycerolpropylene oxide adduct of Example 5(A), 1.3 grams of water, 0.67 gram of dibutyltin laurate and 1.3 grams of a siloxaneoxyalkylene copolymer. 72.6 grams of a mixture of 80 percent of 2,4- and 20 percent 2,6-toluene diisocyanates containing 0.10 percent "Ethocel" (an ethoxylated cellulose having an average ethoxy content of 47.5 to 49 percent) were then added under intensive agitation. As soon as the foaming reaction began the mixture was transferred into an open mold and allowed to set for twenty-four hours at room temperature. The test results were as follows:

Density, lbs./cu. ft. _____ 3.1
50 percent stiffness, ° C. _____ 110–112
Maximum compression strength, p.s.i., at 10% deflection _____ 51

---

[4] Reaction product of 2-hydroxyadipaldehyde and phenol prepared in the following manner: A charge of 2632 grams of phenol (28 moles), 1101 grams of a 23 percent aqueous solution of 2-hydroxyadipaldehyde (2 moles) and 12 cc. of concentrated HCl was placed in a distillation flask connected to a short column. The mixture was heated for 4 hours at 55° C. and the water and excess phenol were then distilled off to a kettle temperature of 180° C. at 2 mm. The residue product weighed 883 grams, hydroxyl number 434.

EXAMPLE 6

Preparation of trimethylolpropane-propylene oxide adduct (A) 4 moles (536 grams) of trimethylolpropane were mixed with 1.0 gram of potassium hydroxide. The mixture was heated to a temperature of 75° C. to 120° C. and 701 grams (12.1 moles) of propylene oxide added over a period of 27.25 hours. The product was treated with Amberlite IR–120 and Nalcite HCR ion exchange resins to remove the potassium hydroxide. The product was then stripped to 110° C. at 9 millimeters of mercury pressure. The product analyzed as follows:

Hydroxyl number _____ 534.4
Propyleneoxy groups per chain (average) _____ 1.04

Preparation of rigid foam (B) 40 grams of 1,1,3,-tris(hydroxypolypropyleneoxyphenyl) propanes (hydroxyl number 262.2) prepared in the manner of Example 1 were mixed with 10 grams of the trimethylolpropane-propylene oxide adduct of Example 6(A), 1.4 grams of water, 0.34 gram of dibutyltin dilaurate and 0.67 gram of a siloxane-oxyalkylene copolymer. 39.5 grams of a mixture of 80 percent of 2,4- and 20 percent 2,6-tolylene diisocyanates containing 0.10 percent "Ethocel" (an ethoxylated cellulose having an average ethoxy content of 47.5 to 49 percent) were then added under vigorous agitation. As soon as the foaming reaction began the mixture was transferred into an open mold and allowed to expand and cure at room temperature. The foam had the following physical properties:

Density, lbs./cu.ft. _____ 2.4
Compression strength at 10% deflection, p.s.i. _____ 38
70% Stiffness temperature, °C. _____ 85
Closed cells, percent _____ 94

EXAMPLE 7

Preparation of 1,1,3-tris(hydroxycresyl) propanes (A) 3420 grams of a cresylic acid fraction (containing a mixture of cresols and xylylenols) boiling from 205° C. to 230° C. was mixed with 12 milliliters of concentrated hydrochloric acid and heated to 51° C. while stirring. The heat was shut off and 118 grams of acrolein fed at a rate such that the exotherm maintained the reaction temperature between 51° C. and 55° C. The acrolein addition was completed in one hundred minutes. The heat was turned on and a temperature of 55° C. maintained for two additional hours. The hydrochloric acid, water of reaction and excess cresylic acid was stripped off to a kettle temperature of 180° C. and a pressure of 2 millimeters of mercury. 700 grams of residue product was obtained having a hydroxyl number of 394.8. The excess cresylic acid distilled from the above reaction was used for another run in which 652 grams of product was obtained having a hydroxyl number of 396.7.

Preparation of 1,1,3-tris(hydroxypolypropyleneoxycresyl) propanes (B) 1310 grams of the above products were mixed with 6.5 grams of potassium hydroxide, heated to 140° C. and 1313 grams of propylene oxide added between 140° C. and 158° C. in a period of twenty-four hours. The product was diluted with approximately three times its volume of isopropanol and percolated over Dowex–50x and Dowex–2x ion exchange columns to remove the potassium hydroxide. The isopropanol was then stripped off to a kettle temperature of 170° C. and 12 millimeters of mercury pressure. The product was a dark, very viscous liquid having a hydroxyl number of 222.8.

Preparation of rigid foam 50 grams of the 1,1,3-tris(hydroxypolypropyleneoxycresyl) propanes (hydroxyl number 222.8) prepared above were mixed with 50 grams of the trimethylolpropane-propylene oxide adduct of Example 6(A) (hydroxyl number 534.4), 1.3 grams of water, 0.67 gram of dibutyltin dilaurate and 1.3 grams of a siloxane-oxyalkylene copolymer. 71.5 grams of a mixture of 80 percent 2,4- and 20 percent, 2,6-tolylene diisocyanates containing 0.10 percent "Ethocel" (an ethoxylated cellulose having an average ethoxy content of 47.5 to 49 percent) were then added under vigorous agitation. As soon as the foaming reaction began the mixture was transferred to an open mold and allowed to foam and cure at room temperature. The foam had the following physical properties:

Density, lbs./cu.ft. _____ 3.2
Compression strength at 10% deflection, p.s.i. _____ 54
70% stiffness temperature, °C. _____ 88
Closed cells, percent _____ 91

EXAMPLE 8

Preparation of hexanetriol-propylene oxide adduct (A) 1072 grams (8.0 moles) of hexflanetriol were mixed with 3.0 grams of potassium hydroxide, heated to 105° C. and 1415 grams (24.4 moles) of propylene oxide added over a period of 13.25 hours between 105° C. and 130° C. 25 grams of magnesium silicate (commercially available as "Magnesol") was added to the mixture and stirred at 120° C. for four hours to remove the potassium hydroxide. The "Magnesol" was then filtered out and the product stripped to 120° C. at 12 millimeters of mercury pressure. The product was analyzed as follows:

Hydroxyl number _____ 547.1
Propyleneoxy groups per chain (average) _____ 1.0

Preparation of rigid foam 50 grams of 1,1,3-tris(hydroxypolypropyleneoxycresyl) propanes of Example 7(B) (hydroxyl number 222.8) were mixed with 50 grams of hexanetriol-propylene oxide adduct (hydroxyl number 547.1), 1.3 grams of water, 0.67 gram of dibutyltin dilaurate and 1.3 grams of a siloxane-oxyalkylene copolymer. 72.7 grams of a mixture of 80 percent 2,4- and 20 percent 2,6-tolylene diisocyanates containing 0.10 percent "Ethocel" (an ethoxylated cellulose having an average ethoxy content of 47.5 to 49 percent) were then added under vigorous agitation. As soon as the foaming reaction began the mixture was transferred to an open mold and allowed to foam and cure at room temperature. The foam had the following physical properties:

Density, lbs./cu.ft. _____ 3.3
Compression strength at 10% deflection, p.s.i. _____ 47
70% stiffness temperature, °C. _____ 76
Closed cells, percent _____ 87

EXAMPLE 9

Preparation of trimethylolethane-propylene oxide adduct (A) 721 grams (6.0 moles) of trimethylolethane were mixed with 2.0 grams of potassium hydroxide, heated to 185° C. and 1050 grams (18.1 moles) of propylene oxide added over a period of 11.25 hours between 105° C. and 120° C. 25 grams of "Magnesol" was added to the mixture and stirred two hours at 100° C. The "Magnesol" was filtered out and the product stripped to 140° C. at 5 millimeters of mercury pressure. The product was analyzed as follows:

Hydroxyl number _____ 576.5
Propyleneoxy groups per chain (average) _____ 0.93

Preparation of rigid foam 55 grams of 1,1,3-tris(hydroxypolypropyleneoxycresyl) propanes of Example 7(B) (hydroxyl number 222.8) were mixed with 45 grams of trimethylolethane-propylene oxide adduct (hydroxyl number 576.5), 1.3 grams of water, 0.67 gram of dibutyltin dilaurate and 1.3 grams of a siloxane-oxyalkylene copolymer. 72.2 grams of a mixture of 80 percent 2,4- and 20 percent 2,6-tolylene diisocyanates containing 0.10 percent of "Ethocel (an ethoxylated cellulose having an average ethoxy content of 47.5 to 49 percent) were then added with vigorous agitation. As soon as the foaming reaction began the mixture was transferred to an open mold and allowed to foam and cure at room temperature. The foam had the following physical properties:

Density, lbs./cu. ft. _____ 3.3
Compression strength at 10% deflection, p.s.i. _____ 50
70% stiffness temperature, ° C. _____ 88
Closed cells, percent _____ 86

EXAMPLE 10

Preparation of pentaerythritol-propylene oxide adduct (A) 408.5 grams (3.0 moles) of pentaerythritol and 1.2 grams of potassium hydroxide were slurried in 512 grams of dry toluene and heated to 105° C. Propylene oxide was fed slowly until the pentaerythritol was in solution. The toluene was stripped off and a total of 1291 grams (22.3 moles) of propylene oxide added between 105° C. and 135° C. The product was diluted with isopropanol and percolated over Dowex-50x and Dowex-2x ion exchange columns. The isopropanol was then stripped off to a temperature of 110° C. and 6 millimeters of mercury pressure. The product analyzed as follows:

Hydroxyl number _____ 419.5
Propyleneoxy groups per chain (average) _____ 1.71

Preparation of rigid foam 80 grams of 1,1,3-tris(hydroxypolypropyleneoxyphenyl) propanes (hydroxyl number 262.2) prepared in the manner of Example 1 were mixed with 20 grams of pentaerythritol-propylene oxide adduct (hydroxyl number 419.5), 1.3 grams of water, 0.67 gram of dibutyltin dilaurate and 1.3 gram of a siloxane-oxyalkylene copolymer. 59.6 grams of a mixture of 80 percent 2,4- and 20 percent 2,6-tolylene diisocyanates containing 0.10 percent "Ethocel" (an ethoxylated cellulose having an average ethoxy content of 47.5 to 49 percent) were then added with vigorous agitation. As soon as the foaming reaction began the mixture was transferred to an open mold and allowed to foam and cure at room temperature. The foam had the following physical properties:

Density, lbs./cu. ft. _____ 3.8
Compression strength at 10% deflection, p.s.i. _____ 91
70% stiffness temperature, ° C. _____ 69

EXAMPLE 11

Preparation of rigid foam 65 grams of 1,1,3-tris(hydroxypolypropyleneoxycresyl) propanes of Example 7(B) (hydroxyl number 222.8) were mixed with 35 grams of glycerol-propylene oxide adduct prepared as in Example 5(A) (hydroxyl number 652.2), 1.3 grams of water, 0.67 gram of dibutyltin dilaurate and 1.3 grams of a siloxane-oxyalkylene copolymer. 71.0 grams of a mixture of 80 percent 2,4- and 20 percent 2,6-tolylene diisocyanates containing 0.10 percent "Ethocel" (an ethoxylated cellulose having an average ethoxy content of 47.5 to 49 percent) were then added with vigorous agitation. As soon as the foaming reaction began the mixture was transferred to an open mold and allowed to foam and cure at room temperature. The foam had the following physical properties:

Density, lbs./cu. ft. _____ 3.7
Compression strength at 10% deflection, p.s.i. _____ 59
70% stiffness temperature, ° C. _____ 89
Closed cells, percent _____ 92

EXAMPLE 12

100 grams of a mixture comprising 66 percent by weight of 1,1,3-tris(hydroxypolypropyleneoxyphenyl) propanes (hydroxyl number 250) and 34 percent by weight of a glycerolpropylene oxide adduct (hydroxyl number 633) were mixed with 94 grams of a semiprepolymer prepared therefrom (30 percent NCO), 1.7 grams dibutyltin dilaurate, 0.47 gram of a silicone oil surfactant (siloxane-oxyalkylene copolymer) and 41 grams of trichloromonofluoromethane. The foamed product, after curing, had the following properties:

| | |
|---|---|
| Density, lbs./cu. ft. | 1.7 |
| Compression strength, p.s.i. at 23° C. | 25 |
| Percent closed cells | 88 |

EXAMPLE 13

8900 grams (94.7 moles) of phenol and 15.8 grams of concentrated HCl (37 percent) catalyst were charged to a reaction kettle and heated to 50° C. While stirring and under a nitrogen atmosphere 556 grams (9.47 moles) of acrolein was fed into the reactor over a period of one hour. The temperature was increased to 100° C. for one-half hour and then the temperature was increased slowly to 180° C. letting water of reaction distill out. The temperature was held at 180° C. while the pressure was gradually reduced. The temperature was held at 180° C. for a total of eight hours. The resulting condensation product had a molecular weight of 328.

A polyether was prepared from the above condensation product by charging 1960 grams of the product and 5.5 grams of KOH pellets to a twelve-liter reaction flask equipped with a stirrer, Dry Ice condenser, thermometer, nitrogen inlet tube and dropping funnel, heating the flask contents to 150° C. and adding 2516 grams of propylene oxide while stirring under a nitrogen atmosphere. The temperature varied during the oxide addition from 150° C. to 175° C. The polyether had a hydroxyl number of 255.

3991 grams of the above polyol were blended with 1899 grams of a propylene oxide adduct of glycerol having a hydroxyl number of 653. After removal of ionic impurities by means of ion exchange, the resulting blend had the following analysis:

| | |
|---|---|
| Hydroxyl number | 386 |
| Acid number | 0.039 |
| Water content, percent | 0.028 |
| Viscosity, cps. at 25° C. | 27,600 |

A portion of this polyol blend was converted to a quasi-prepolymer by reacting 1589 grams of an 80:20 mixture of 2,4- and 2,6-tolylene diisocyanates with 480 grams of the polyol blend at 70° C. The resulting prepolymer had an NCO-content of 30.5 percent.

A rigid foam from the above polyol blend was prepared as follows: 90.1 grams of the above polyol blend (hydroxyl number 386), 9.9 grams of a propylene oxide adduct of diethylene triamine having a hydroxyl number of 672.5, 32 grams of trichloromonofluoromethane, 0.1 gram of dibutyltin dilaurate catalyst, and 0.6 gram of a siloxane-oxyalkylene surfactant were mixed thoroughly. 109.5 grams of the above prepolymer were then added to the mix and the ingredients were stirred rapidly until the mixture began to foam. The foaming mass was transferred to an open mold and allowed to expand. The resulting foam had the following physical properties:

| | |
|---|---|
| Density, lbs./cu. ft. | 2.0 |
| Closed cells, percent | 89 |
| Compressive strength parallel to foam rise, p.s.i. | 36 |
| Volume change, humid aging, 4 weeks at 158° F., 95% rel. humidity, percent increase | 69 |

EXAMPLE 14

8900 grams (94.7 moles) of phenol and 23.6 grams of a 1:1 molar complex of boric and oxalic acids were charged to a reaction kettle and heated to 70° C. 556 grams (9.47 moles) of acrolein was fed into the kettle over a period of one hour while stirring at 70° C. The temperature of the reaction mixture was increased to 120° C. for one-half hour. The temperature was then increased to 180° C. at atmospheric pressure to destroy the acid catalyst complex. After one hour at 180° C. the pressure was gradually lowered to distill off the remaining water and excess phenol. The temperature was held at 180° C. at a low pressure after phenol distillation was completed. Upon cooling a red-brown glassy product was recovered. The molecular weight of the product was 411.

1960 grams (4.77 moles) of the pulverized product from above was charged to the equipment used in example 13 above and heated to 150° C. 4.5 grams of KOH pellets was added after fifteen minutes stirring the propylene oxide feed was started. 2365 grams (40.8 moles) of propylene oxide was fed over a period of twenty-four hours at temperatures ranging from 140° C. to 177° C. 5.0 grams more of KOH was added during the addition period to accelerate the reaction rate. The polyether product had a hydroxyl number of 255.

4013 grams of the above polyol were blended with 1837 grams of a propylene oxide adduct of glycerol having a hydroxyl number of 653. After removal of ionic impurities by means of ion exchange, the resulting polyol blend had the following analysis:

| | |
|---|---|
| Hydroxyl number | 379 |
| Acid number | 0.088 |
| Water content, percent | 0.019 |
| Viscosity, cps. at 25° C. | 38,200 |

A portion of this polyol blend was converted to a quasi-prepolymer by reacting 1572 grams of an 80:20 mixture of 2,4- and 2,6-tolylene diisocyanates with 473 grams of the above polyol blend at 70° C. The resulting prepolymer had an NCO content of 30.3 percent.

A rigid foam from the above polyol blend and prepolymer was prepared as follows: 84.5 grams of the above polyol blend (hydroxyl number 379), 12.5 grams of a propylene oxide adduct of diethylene triamine having a hydroxyl number of 672.5, 32 grams of trichloromonofluoromethane, 0.3 gram of dibutyltin dilaurate catalyst and 0.6 gram of a siloxane-oxyalkylene surfactant were mixed thoroughly. 111 grams of the above prepolymer were then added to the mix and the ingredients were stirred rapidly until the mixture began to foam. The foaming mass was transferred to an open mold and allowed to expand. The resulting foam had the following physical properties:

| | |
|---|---|
| Density, lbs./cu. ft. | 1.91 |
| Closed cells, percent | 92.8 |
| Compressive strength parallel to foam rise, p.s.i. | 30.4 |
| Volume change, humid aging, 4 weeks at 158° F., 95% rel. humidity, percent increase | 26 |

EXAMPLE 15

4400 grams (46.8 moles) of phenol was charged to a reaction kettle and heated to 50° C. under a nitrogen atmosphere. 17.4 grams of concentrated HCl solution (37 percent) was added while stirring. Then during a 1.5 hour period 526 grams (9 moles) of acrolein was fed into the reactor while the temperature was held at 50° C. After completion of the acrolein feed the temperature of the reaction mixture was raised to 100° C. for one-half hour. After the cook-out period the temperature was gradually increased as the pressure was decreased to distill out the water of reaction and excess phenol. After the distillation was complete the product was held at 180° C. and a pressure of 3 millimeter of mercury for one hour. The condensation product had an hydroxyl number of 516, and its molecular weight was 450.

A polyether was prepared as in Examples 1 and 2 by adding 2270 grams (32.2 moles) of propylene oxide to 1959 grams (4.35 moles) of the condensation product from above. 5.5 grams of KOH pellets were used as catalyst. The reaction time was twenty-three hours at a temperature of 135° C. to 155° C. The refined polyether, purified by means of ion exchange, analyzed as follows:

Hydroxyl number _____ 265
Acid number _____ 0.03
Water, percent _____ 0.026

2000 grams of the above polyol were blended with 952 grams of a propylene oxide adduct of glycerol having a hydroxyl number of 653. After removal of ionic impurities by means of ion exchange, the resulting polyol blend had the following analysis:

Hydroxyl number _____ 398
Acid number _____ 0.034
Water content, percent _____ 0.041
Viscosity, cps. at 25° C. _____ 55,400

A portion of this polyol blend was converted to a quasi-prepolymer by reacting 790 grams of an 80:20 mixture of 2,4- and 2,6-tolylene diisocyanates with 234 grams of the above polyol blend at 70° C. The resulting prepolymer had an NCO content of 30.4 percent.

A rigid foam from the above polyol blend and prepolymer was prepared as follows: 78.9 grams of the above polyol blend (hydroxyl number of 398), 21.1 grams of a propylene oxide adduct of diethylene triamine having a hydroxyl number of 672.5, 32 grams of trichloromonofluoromethane, 0.3 gram of dibutyltin dilaurate catalyst, and 0.6 gram of a siloxane-oxyalkylene surfactant were mixed thoroughly. 121 grams of the above prepolymer were then added to the mix, and the ingredients were stirred rapidly until the mixture began to foam. The foaming mass was transferred to an open mold and allowed to expand. The resulting foam had the following physical properties:

Density, lbs./cu. ft. _____ 2.1
Closed cells, percent _____ 93
Compressive strength, parallel to foam rise, p.s.i. ____ 37
Volume change, humid aging, 4 weeks at 158° F., 95% rel. humidity, percent increase _____ 20

EXAMPLE 16

4450 grams (47.35 moles) of phenol and 23.6 grams of boric-oxalic acid complex were charged to a reaction flask and heated at 70° C. under nitrogen. 556 grams (9.47 moles) of acrolein was added over a period of one hour. The temperature was then increased to 120° C. for one and one-half hours. After increasing the temperature to 180° C., the water and excess phenol was stripped off under reduced pressure. The product had a molecular weight of 528.

2360 grams (40.7 moles) of propylene oxide was added to 1878 grams (3.6 moles) of the above product using 5.5 grams KOH as catalyst. The total reaction time was twenty-eight hours at 140° C. to 163° C. The recovered polyether product had an hydroxyl number of 255.

4035 grams of the above polyol were blended with 1830 grams of a propylene oxide adduct of glycerol having a hydroxyl number of 653. After removal of ionic impurities by means of ion exchange, the resulting polyol blend had the following analysis:

Hydroxyl number _____ 374.5
Acid number _____ 0.045
Water content, percent _____ 0.017
Viscosity, cps. at 25° C. _____ 58,640

A portion of this polyol blend was converted to a quasi-prepolymer by reacting 1573 grams of an 80:20 mixture of 2,4- and 2,6-tolylene diisocyanates with 474 grams of the above polyol blend at 70° C. The resulting prepolymer had an NCO content of 29.8 percent.

A rigid foam from the above polyol blend and prepolymer was prepared as follows: 70.5 grams of the above polyol blend (hydroxyl number of 374.5), 29.5 grams of a propylene oxide adduct of diethylene triamine, 32 grams of trichloromonofluoromethane, 0.3 gram of dibutyltin dilaurate catalyst, and 0.6 gram of a siloxane-oxyalkylene surfactant were mixed thoroughly. 122.8 grams of the above prepoylmer were then added to the mix, and the ingredients were stirred rapidly until the mixture began to foam. The foaming mass was transferred to an open mold and allowed to expand. The resulting foam had the following physical properties:

Density, lbs./cu. ft. _____ 2.2
Closed cells, percent _____ 90
Compressive strength, parallel to foam rise, p.s.i. ____ 50
Volume change, humid aging, 4 weeks at 158° F., 95% rel. humidity, percent increase _____ 17

EXAMPLE 17

752 pounds (8.0 lb. moles) of phenol and 1.9 pounds of boric-oxalic acid complex was charged to a 100-gallon reactor. The phenol-catalyst mixture was heated to 60° C. and 90 pounds (1.61 lb. moles) of acrolein was pumped into the reactor over a two-hour period. After the acrolein feed was completed the temperature was raised to 102° C. for one hour. Vacuum was then applied to the system and the water of reaction and excess phenol was distilled off over a period of eighteen hours to a kettle temperature of 182° C. 361.5 pounds of condensation product having a molecular weight of 635 was recovered.

Two polyethers were prepared from the above condensation product as described below.

(A) 51 pounds (.08 lb. mole) of condensation product and 50 grams of KOH were charged to a reactor and 49 pounds (.845 lb. mole) of propylene oxide was added over a period of 13.75 hours at a temperature of 108° C. to 138° C. The product had an hydroxyl number of 265.

(B) 48.5 pounds (.076 lb. mole) of condensation product and 50 grams of KOH was charged to the reactor and 49.8 pounds (.86 lb. mole) of propylene oxide was added at a temperature of 128° C. to 142° C. The product had an hydroxyl number of 257.

4011 grams of polyol A were blended with 1691 grams of propylene oxide adduct of glycerol having a hydroxyl number of 653. The resulting polyol blend, hereinafter referred to as blend C, was refined by means of ion exchange.

4000 grams of polyol B were blended with 1795 grams of a propylene oxide adduct of glycerol having a hydroxyl number of 653. The resulting polyol blend, hereinafter referred to as blend D, was refined by means of ion exchange. Blends C and D had the following analyses:

|  | Blend C | Blend D |
| --- | --- | --- |
| Hydroxyl number | 375 | 377 |
| Acid number | 0.015 | 0.017 |
| Water content, percent | 0 | 0 |
| Viscosity, cps. at 25° C. | 204,800 | 147,200 |

A portion of blend C and blend D was converted to a prepolymer by reacting with an 80:20 mixture of 2,4- and 2,6-tolylene diisocyanate. Below, the charging ratios and NCO analyses are given for both prepolymers:

|  | Prepolymer Blend C | Prepolymer Blend D |
| --- | --- | --- |
| Diisocyanate | 2,360 | 1,574 |
| Blend C | 711 |  |
| Blend D |  | 473 |
| NCO, percent | 30.05 | 30.15 |

Rigid polyurethane foams from the above ingredients were prepared according to the procedure described in Example 16. Foam ingredients and physical properties of the resulting foams were as follows:

| Ingredients | Foam 1 | Foam 2 |
|---|---|---|
| Blend C | 86 | |
| Blend D | | 86.6 |
| Trichloromonofluoromethane | 32 | 32 |
| Propylene oxide adduct of diethylene triamine, hydroxyl number=672.5 | 14 | 13.4 |
| Dibutyltin dilaurate | 0.1 | 0.1 |
| Surfactant | 0.6 | 0.6 |
| Prepolymer Blend C | 112 | |
| Prepolymer Blend D | | 112 |
| Physical Properties: | | |
| Density, lbs./cu. ft | 2.03 | 2.06 |
| Closed cells, percent | 90.5 | 91.8 |
| Compressive strength, parallel to foam rise, p.s.i. | 41.6 | 39.6 |
| Volume change, humid aging, 4 weeks at 158° F., 95% rel. humidity, percent increase | 12 | 14 | were obtained by the use of a crosslinking agent in conjunction with polyol E. In preparing the foams described in Table I, polyol E, a crosslinking agent, if any, the fluorocarbon, the catalyst, and the surfactant were mixed thoroughly. Tolylene diisocyanate was then added and the mixture was agitated vigorously until the mass started foaming. The foaming mix was transferred to an open mold and allowed to expand. Ingredients of foams 1 through 13 and physical properties of the resulting foams are described in Table I.

Molecular weights of the phenolic condensation products described in Examples 13 through 18 were obtained by dissolving a known amount of the condensation product in acetone and following the molecular weight determination method described by A. P. Brady et al., J. Phys. & Coll. Chem., 55, 304 (1951).

TABLE I

| Foam | 1 | 2 | 3 | 4 | 5 | 6 | 7 | 8 | 9 | 10 | 11 | 12 | 13 |
|---|---|---|---|---|---|---|---|---|---|---|---|---|---|
| Ingredients, parts: | | | | | | | | | | | | | |
| Polyol E | 140 | 136.2 | 131.9 | 134 | 127.1 | 130.6 | 119.6 | 134.1 | 127.1 | 126 | 109.5 | 114.8 | 85.0 |
| Glycerol | | 3.8 | 8.1 | | | | | | | | | | |
| 1,2,6-hexanetriol | | | | 6 | 12.9 | | | | | | | | |
| Triisopropanolamine | | | | | | 9.4 | 20.4 | | | | | | |
| Trimethylolpropane | | | | | | | | 5.9 | 12.9 | | | | |
| DTA-PO Adduct [1] | | | | | | | | | | 14 | 30.5 | | |
| Sorbitol-PO Adduct [2] | | | | | | | | | | | | 25.2 | 55.0 |
| Trichlorofluoromethane | 29.4 | 29.4 | 29.4 | 29.4 | 29.4 | 29.4 | 29.4 | 29.4 | 29.4 | 29.4 | 29.4 | 29.4 | 29.4 |
| Dibutyltin dilaurate | 0.84 | 0.28 | 0.28 | 0.28 | 0.28 | 0.14 | 0.14 | 0.28 | 0.28 | 0.14 | 0.14 | 0.56 | 0.56 |
| Surfactant [3] | 0.42 | 0.42 | 0.42 | 0.42 | 0.42 | 0.42 | 0.42 | 0.42 | 0.42 | 0.42 | 0.42 | 0.42 | 0.42 |
| Tolylene Diisocyanate [4] | 58.7 | 68.4 | 80 | 68.4 | 80 | 68.4 | 80 | 68.4 | 80 | 68.4 | 80 | 68.4 | 80 |
| Physical Properties: | | | | | | | | | | | | | |
| Density, lbs./cu. ft | 1.98 | 2.07 | 2.06 | 2.13 | 2.18 | 2.18 | 2.16 | 2.15 | 2.20 | 2.12 | 2.06 | 2.10 | 2.06 |
| Closed cells, percent | 91.9 | 89.9 | 88.9 | 89.0 | 86.5 | 92.2 | 89.2 | 88.0 | 87.5 | 91.2 | 94.1 | 90.7 | 83.2 |
| Compressive strength, parallel to rise, p.s.i. | 35.2 | 37.8 | 32.2 | 36.8 | 35.6 | 38.8 | 38.9 | 37.8 | 36.0 | 42.3 | 46.6 | 34.8 | 33.7 |
| Percent volume increase, 4 weeks humid ageing 158° F., 95% rel. humidity | 39 | 17 | 12 | 16 | 10 | 12 | 9 | 17 | 11 | 12 | 8 | 22 | 16 |

[1] Propylene oxide adduct of diethylene tramine, hydroxyl number 672.5. [2] Propylene oxide adduct of sorbitol, hydroxyl number 482, water content 0.17%. [3] Polysiloxane-polyoxyalkylene surfactant L-520, Union Carbide Corp., Silicones Division. [4] 80:20 Mixture of 2,4- and 2,6-tolylene diisocyanates.

EXAMPLE 18

Phenol (52,000 parts) and oxalic acid dihydrate catalyst (1200 parts) were charged to a stirred reactor and the mixture was heated to 70° C. Acrolein (3515 parts) was then added slowly while maintaining a temperature of 70° C. and a pressure of 5 to 20 p.s.i.g. After completion of the acrolein addition the reactants were heated to 120° C. and maintained for two hours. The temperature was then increased to 180° C. and held for two hours. Thereafter, water of reaction, catalyst decomposition products and excess phenol were removed by distillation to a final pressure of 12 millimeters of mercury at 195° C. The yield of the resulting condensation product was 16,500 parts. The molecular weight of the condensation product was 420.

After cooling of the above condensation product to 150° C., potassium hydroxide catalyst (35 parts) was added and a total of 18,640 parts of propylene oxide was then added at 150° C. to 170° C. and 5 to 50 p.s.i.g. After completion of the oxide addition, ionic impurities were removed by means of ion exchange. The resulting polyol, hereinafter referred to as polyol E, had the following analysis:

| | |
|---|---|
| Hydroxyl number | 248.0 |
| Acid number | 0.083 |
| Water content, percent | 0.02 |

Polyol E was utilized in the preparation of a number of rigid foams by the one-shot technique. Best results

What is claimed is:
1. A method for the preparation of cellular polyurethane foams in which a polyether and an organic polyisocyanate are reacted together in the presence of a blowing agent, wherein said polyether comprises a hydroxypolyalkyleneoxyarylalkane of the formula:

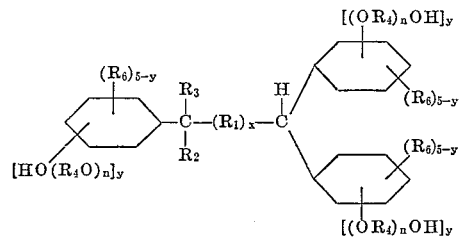

in which $R_1$ is a divalent saturated aliphatic hydrocarbon radical containing one to ten carbon atoms; $R_2$ is a member selected from the group consisting of hydrogen and hydroxypolyalkyleneoxyaryl; $R_3$ is a member selected from the group consisting of hydrogen and lower alkyl radicals; $R_4$ is a member selected from the group consisting of ethylene and propylene radicals and mixtures thereof; $R_6$ is a member selected from the group consisting of hydrogen, hydroxypolyalkyleneoxyarylalkyl, alkoxy, alkyl and cycloalkyl radicals; $n$ is a number having a value of at least one; $x$ is an integer having a value of 0 to 1; and $y$ is an integer of 1 to 3.

2. The polyurethane foam produced by the method of claim 1.

3. A method for the preparation of cellular polyurethane foams which comprises reacting, in the presence of a blowing agent, an organic polyisocyanate with an alkylene oxide addition product of a polyphenylol mixture produced by the condensation of an aryl hydroxide free of substitution in at least one of the positions ortho and para to a hydroxyl group of said hydroxide, with an aldehyde from the group consisting of dialdehydes and ethylenically unsaturated aldehydes.

4. The polyurethane foam produced by the process of claim 3.

5. The method of claim 3 wherein said polyether is an ethylene oxide addition product of a polyphenylol mixture produced by the condensation of phenol with acrolein.

6. The method of claim 3 wherein said polyether is a propylene oxide addition product of a polyphenylol mixture produced by the condensation of phenol with acrolein.

7. The method of claim 3 wherein said polyether is the ethylene oxide addition product of a polyphenylol mixture produced by the condensation of phenol with glyoxal.

8. The method of claim 3 wherein said polyether is an ethylene oxide addition product of a polyphenylol mixture produced by the condensation of phenol with glutaraldehyde.

9. The method of claim 3 wherein said polyether is a propylene oxide addition product of a polyphenylol mixture produced by the condensation of cresol with acrolein.

10. The method of claim 3 wherein said polyether is an ethylene oxide addition product of a polyphenylol mixture produced by the condensation of phenol with 2-hydroxyadipaldehyde.

11. The method of claim 3 wherein there is included as an additional polyether reactant a propylene oxide addition product of pentaerythritol.

12. The method of claim 3 wherein said blowing agent is trichloromonofluoromethane.

13. The method of claim 3 wherein there is included as an additional component, a polyfunctional reactant selected from the group consisting of aliphatic polyamine, aliphatic polyol, aliphatic polyamine-alkylene oxide adduct and aliphatic polyol-alkylene oxide adduct.

14. The polyurethane foam produced by the method of claim 13.

15. A rigid polyurethane foam prepared by a process which comprises reacting in the presence of a blowing agent (1) a mixture of organic polyisocyanates of the formula:

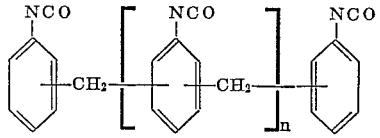

wherein $n=$an integer, (2) a propylene oxide adduct of a tris(hydroxyphenyl)propane,
(3) a propylene oxide adduct of glycerine, and
(4) a propylene oxide adduct of diethylenetriamine.

References Cited

UNITED STATES PATENTS 2,843,568   7/1958   Benning et al. _____ 260—2.5

DONALD E. CZAJA, *Primary Examiner.*

F. McKELVEY, *Assistant Examiner.*